United States Patent
Vilsmeier et al.

(10) Patent No.: US 6,178,345 B1
(45) Date of Patent: Jan. 23, 2001

(54) METHOD FOR DETECTING THE EXACT CONTOUR OF TARGETED TREATMENT AREAS, IN PARTICULAR, THE EXTERNAL CONTOUR

(75) Inventors: Stefan Vilsmeier, Poing; Rainer Birkenbach, Feldkirchen, both of (DE)

(73) Assignee: BrainLAB Med. Computersysteme GmbH, Heimstetten (DE)

( * ) Notice: Under 35 U.S.C. 154(b), the term of this patent shall be extended for 0 days.

(21) Appl. No.: 09/309,097

(22) Filed: May 10, 1999

(30) Foreign Application Priority Data

Jun. 30, 1998 (DE) .............................................. 198 29 230

(51) Int. Cl.⁷ ....................................................... A61B 5/05

(52) U.S. Cl. ............................................................. 600/425

(58) Field of Search ............................................... 600/425

(56) References Cited

U.S. PATENT DOCUMENTS 5,570,430 * 10/1996 Sheehan et al. ...................... 600/425

\* cited by examiner

*Primary Examiner*—William E. Kamm
(74) *Attorney, Agent, or Firm*—Renner, Otto, Boisselle & Sklar LLP

(57) ABSTRACT

A method for mapping surgical target site contours precisely, especially the outer contour thereof, comprises the following steps:

producing a plane slice image through the surgery site in the region of the surgery target whereby the plane of the slice image is located substantially perpendicular to a a plane of symmetry of the surgery target site;

assigning the images split by the plane of symmetry, more particularly by mirrowing at the plane of symmetry; and establishing the difference in the image contents between the assigned split images and processing the resulting information to determine the location of the contour of the surgery target site, especially the outer contour thereof in the plane of the slice image.

6 Claims, No Drawings

METHOD FOR DETECTING THE EXACT CONTOUR OF TARGETED TREATMENT AREAS, IN PARTICULAR, THE EXTERNAL CONTOUR

BACKGROUND OF THE INVENTION

1. Field of the Invention

The invention relates to a method for detecting the exact contour of targeted treatment areas, in particular, the external contour, i.e. mapping surgical target site contours precisely, especially the outer contour thereof.

In lesion surgery, use is made of invasive or non-invasive (radiation therapy) methods, in which it is principally desirable to be aware of the precise outer contours of the lesion so as to avoid disturbing healthy tissue surrounding the lesion during surgery. It is particularly important in the case of brain surgery to precisely distinguish between healthy and diseased tissue in deciding implementation invasive or non-invasive.

2. Description of Prior Art

Computer-assisted surgery has recently become popular, whereby surgical target site data is mapped by means of CT or MRI tomography and a referencing method, stored as slice images for various mapping planes and made available to the surgeon via a computer system and a display monitor.

In accordance with the methods used to date the surgeon in preparing for the operation marks the lesion requiring surgery or its contour in each slice plane with the aid of a display cursor. Marking is done manually for each of the slice planes in sequence, i.e. in each of three directions standing perpendicular to the other so that from the information provided as a whole the three-dimensional configuration of the lesion can be computed. It is with this information as to the configuration and location of the lesion that computer-assisted surgery can then be undertaken, the outer contour, i.e. distinguishing healthy surrounding tissue being particularly important in this respect.

The main drawback of this conventional method of marking the contour is its relative inaccuracy, due not only to the marking being done manually but also attributable to other unavoidable factors.

Thus, on the one hand, in the images displayable on the computer the transitions between healthy and diseased tissue are often quite unclear or blurred and accordingly hardly discernible to the naked eye. whilst. on the other, it may be that a healthy structure is just located in the surroundings of the diseased tissue which furnishes the same color or gray scale value as the diseased tissue in the computer display. It is particularly in the latter case that making a distinction between the two with the naked eye is very difficult or even impossible and there is thus the risk that marking lacking sufficient precision is to the detriment of healthy tissue in the operation on the basis of the marking data. Particularly in the brain quite natural changes in density exist in many locations which detriment or even make it impossible to detect the outer contour of lesions as described above.

SUMMARY OF THE INVENTION

It is thus the object of the present invention to provide a method for mapping surgical target site contours precisely, especially the outer contour thereof, which obviates the disadvantages of prior art as cited above. More particularly, the intention is to make possible a precise contour, more particularly outer contour mapping of surgery target sites.

This object is achieved in accordance with the invention by a method for mapping surgical target site contours precisely, especially the outer contour thereof comprising the following steps:

producing a plane slice image through the surgery site in the region of the surgery target whereby the plane of the slice image is located substantially perpendicular to a a plane of symmetry of the surgery target site;

assigning the images split by the plane of symmetry, more particularly by mirrowing at the plane of symmetry; and establishing the difference in the image contents between the assigned split images and processing the resulting information to determine the location of the contour of the surgery target site, especially the outer contour thereof in the plane of the slice image.

In other words, the problem of inaccuracies in the case of symmetrical surgery target sites, as often exists, for example, in the human body, is solved in that the information taken from a symmetrical healthy counterpart to the diseased surgery target site is made use of in mapping the contour. When, for example, a healthy change in density (bone, denser tissue) produces in the vicinity of the lesion the same gray scale or color value in the computer image and thus permits precise mapping of the contour, the outer contour of such a non-diseased tissue structure may be precisely mapped with the aid of the image of the assigned healthy structure. Thus, when the "healthy image" is assigned to the "diseased image", for example by overlapping or mirrowing at the plane of symmetry it is accordingly possible to advantage in accordance with the invention, despite the imprecise contour information from the "diseased image", to obtain a precise distinction between healthy and diseased tissue since it is now simple to establish that it is there where healthy tissue no longer exists, that diseased tissue must commence.

By means of the method in accordance with the invention it has now become possible for the first time to map the contour of surgery targets in such difficult sites and, in addition to this, may now also be implemented with high accuracy.

The slice images required may be produced in three planes by means of an imaging method, more particularly by CT or MRI or by PET or SPECT tomography.

In one preferred embodiment of the present invention assigning the split images is done with the aid of the computer by means of stored slice image data.

There is now the possibility of establishing the difference in the image contents by forming the difference of locally assigned color or gray scale values in the various split images. The tissue is thus segmented by subtracting the color or gray scale values, i.e. preferably by a digital computer-assisted subtraction to thus "filter out" the healthy tissue from the image.

As already indicated, the mapping data of the contour, especially the outer contour, may be stored and following sensing in several planes of the slice image may be made use of to define the complete contour, especially the outer contour of the surgery target site. Accordingly, after implementation of the method in accordance with the invention for subsequent slice images three-directionally the precise outer contour of the surgery target site is available for display three-dimensionally or in three slice planes on the computer and for use in assisting surgery.

It is to be noted in this respect that by means of the contour mapping in accordance with the invention, when implemented computer-assisted, preparing for the operation is now possible much quicker than by conventional manual contour marking means.

More particularly the method in accordance with the invention lends itself in preparing for invasive or non-invasive brain surgery, the brain having in many areas a sufficiently symmetrical structure parted by the so-called brain centerline (brain centerplane). The difficulties as cited above in manual or visual contour definition in accordance with prior art are also to be anticipated all the more where the brain is involved since it is here that often natural changes in density exist. This is why, in a method in accordance with the invention aimed at brain surgery the brain centerline is made use for assigning the images split by the the axis of symmetry, especially as the mirrowing axis.

Assignment may be rendered even more precise by also precisely superimposing natural landmarks, for example bone ends or explicitly identifiable tissue contours with the aid of the computer. In all, the present invention thus provides a fast, precise means of making it possible for the first time to map the contour of surgery target site.

What is claimed is:

1. A method for mapping surgical target site contours precisely, especially the outer contour thereof, comprising the following steps:

producing a plane slice image through the surgery site in the region of the surgery target whereby the plane of the slice image is located substantially perpendicular to a a plane of symmetry of the surgery target site;

assigning the images split by the plane of symmetry, more particularly by mirrowing at the plane of symmetry; and establishing the difference in the image contents between the assigned split images and processing the resulting information to determine the location of the contour of the surgery target site, especially the outer contour thereof in the plane of the slice image.

2. The method as set forth in claim 1 wherein the slice image is produced by means of an imaging method, more particularly a CT, MRI, PET or SPECT method.

3. The method as set forth in claim 1 wherein assigning the split images is done computer-assisted by means of stored slice image data.

4. The method as set forth in claim 3 wherein the mapping data of the contour, especially the outer contour, may be stored and following sensing in several planes of the slice image made use of to define the complete contour, especially the outer contour of the surgery target site.

5. The method as set forth in claim 1 wherein establishing the difference in the image contents is done via differentiation of locally assigned color or gray scale values in the various split images.

6. The method as set forth in claim 1 wherein in brain surgery the brain centerline is made use for assigning the images split by the the axis of symmetry, especially as the mirrowing axis.

* * * * *